US006452597B1

(12) United States Patent
Goldberg et al.

(10) Patent No.: US 6,452,597 B1
(45) Date of Patent: Sep. 17, 2002

(54) DISPLAYING TEXT ON A LIMITED-AREA DISPLAY SURFACE

(75) Inventors: Jossef Goldberg; Benjamin N. Rabelos; Sarah E. Zuberec, all of Seattle; Timothy J. Cullen, Redmond; Stuart N. DeSpain, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/382,358

(22) Filed: Aug. 24, 1999

(51) Int. Cl.[7] .......................... G09G 5/26; G08B 5/22; H04Q 1/30; H04Q 7/00

(52) U.S. Cl. ...................................... 345/472; 340/7.55

(58) Field of Search ................................ 345/472, 689, 345/660; 707/517, 519, 540; 340/7.43, 7.47, 7.55; 382/298, 301

(56) References Cited

U.S. PATENT DOCUMENTS

| | | | | | |
|---|---|---|---|---|---|
| 4,486,857 | A | * | 12/1984 | Heckel | 707/508 |
| 5,212,477 | A | * | 5/1993 | Indekeu et al. | 340/7.55 |
| 5,231,579 | A | * | 7/1993 | Tsuchiya et al. | 707/508 |
| 5,258,739 | A | * | 11/1993 | DeLuca et al. | 340/7.55 |
| 5,635,978 | A | * | 6/1997 | Alten et al. | 348/569 |
| 5,682,133 | A | * | 10/1997 | Johnson et al. | 340/426 |
| 5,691,708 | A | * | 11/1997 | Batchelder et al. | 340/7.29 |
| 5,805,981 | A | * | 9/1998 | Sugio et al. | 455/38.4 |
| 5,828,313 | A | * | 10/1998 | Mochizuki | 340/825.44 |
| 5,870,682 | A | * | 2/1999 | Miwa et al. | 340/7.55 |
| 5,936,545 | A | * | 8/1999 | Tsumura | 340/7.55 |
| 6,067,070 | A | * | 5/2000 | Suzuki et al. | 345/660 |
| 6,107,944 | A | * | 8/2000 | Behr et al. | 340/995 |
| 6,128,012 | A | * | 10/2000 | Seidensticker, Jr. et al. | 345/685 |
| 6,131,103 | A | * | 10/2000 | Yun | 707/542 |
| 6,138,039 | A | * | 10/2000 | Sudo et al. | 345/159 |
| 6,144,389 | A | * | 11/2000 | Toshimoto et al. | 340/7.55 |
| 6,148,178 | A | * | 11/2000 | Nelms et al. | 455/38.4 |
| 6,166,621 | A | * | 12/2000 | Burgan et al. | 340/7.55 |
| 6,202,023 | B1 | * | 3/2001 | Hancock et al. | 701/201 |
| 6,229,519 | B1 | * | 5/2001 | Narusawa | 345/26 |
| 6,266,060 | B1 | * | 7/2001 | Roth | 345/853 |
| 6,272,332 | B1 | * | 8/2001 | Matsumoto et al. | 455/412 |
| 6,279,018 | B1 | * | 8/2001 | Kudrolli et al. | 707/540 |

OTHER PUBLICATIONS

Nokia 6160 Owners Manual, 1999, 10 pages.

"The Nokia 3110 Redefines Ease of Use for Cellular Phones", http://www.nokia.com/news/news_htmls/nmp_970312b.html, Mar. 12, 1997, 1 page.

"Nokia Launches The New Nokia 8110i GSM Handportable, Incorporating Smart Messaging"; http://www.nokia.com/news/news_htmls/nmp$_{13}$ 970312c.html, Mar. 12, 1997, 1 page.

"AT&T Launches First National One–Rate Wireless Service Plan" http://ww.att.com/press/0598/980507.cha.html, May 7, 1998, pp. 1–4.

"Nokia Introduces TDMA Handsets to the New 6100 Family", http://www.nokia.com/news/news_htmls/nmp_980108a.html, Jan. 8, 1998, pp. 1–2.

* cited by examiner

*Primary Examiner*—Jeffery Brier
*Assistant Examiner*—Ryan Yang
(74) *Attorney, Agent, or Firm*—Lee & Hayes, PLLC

(57) ABSTRACT

The size of information being display by a computer is automatically adjusted in order to make the information easily readable, while at the same time leaving most (or all) of the information displayed on a single screen. Any one or more of the font point size, the font type, the number of lines used, and the caption used can be adjusted in order to determine the manner in which the information is displayed.

30 Claims, 5 Drawing Sheets

DISPLAYING TEXT ON A LIMITED-AREA DISPLAY SURFACE

TECHNICAL FIELD

This invention relates to the display of information on computerized devices, such as automotive computers, that have limited display areas. More particularly, the invention relates to automatically adjusting the size of information being displayed on such a computerized device to effectively utilize the available display area.

BACKGROUND OF THE INVENTION

Computer technology is continually advancing, continually providing new and expanded uses for computers. One such use is in vehicles, such as an automobile or truck. Programmable devices and controllers for controlling various engine and other system functions within a vehicle have been used for a number of years. Additionally, other devices for providing basic feedback to a vehicle operator, such as mileage or number of miles that can be driven before refueling, have also been used for a number of years. However, as computer technology has advanced a new field of use for computers has opened up, allowing more conventional "desktop computer" functionality to be made available to vehicle operators via "vehicle computers".

One problem experienced with computers in general, and more particularly with vehicle computers, is difficulty reading the information displayed. Information, such as program data or instructions, is typically provided to a user via a display device, such as a cathode ray tube (CRT) monitor or a liquid crystal diode (LCD) display. To be useful, such information should be easily readable by the user. This is particularly true in a vehicle computer because the user (e.g., driver of the vehicle) may only be able to take brief glances at the display due to the user's primary focus being on driving the vehicle.

In order to make the information easily readable, it should be displayed in a large size. For example, a vehicle computer may display a street address of a location that the driver is trying to find. However, when a large amount of information is displayed, problems can arise because the computer may not be able to display the information on a single "screen" of the display. For example, if the information is the street address "12345 Washington Street, Building 5", it may be too much information for a single screen using the desired large font size.

One solution to this problem is to display the information using multiple "screens". For example, the data "12345 Washington" may be on a first screen and the user can scroll to a second screen to see "Street, Building 5". However, this can be confusing to the user and requires the user to take attention away from other activities (e.g., his or her driving) to scroll between pages.

Another solution is to display as much of the information as possible and omit the remainder. For example, "12345 Washington" may be displayed and the remainder omitted. This is problematic because important information (e.g., "Building 5") may be omitted that prevents the user from accurately identifying the address. Furthermore, the omitted information may make the remaining information ambiguous. For example, a city may include a "Washington Street" and a "Washington Court". If the word "street" is dropped from the display, then the driver would not be able to determine if he or she were supposed to be going to Washington Street or Washington Court.

The invention described below addresses these disadvantages, providing a way to improve the display of information on small display surfaces.

SUMMARY OF THE INVENTION

The invention concerns the display of information on small display surfaces in a manner that allows the user to easily read the information. The invention automatically adjusts the size of information being displayed by the computer system in order to make the information easily readable, while at the same time leaving most (or all) of the information displayed on a single screen.

According to one aspect of the invention, any one or more of the font point size, the font, the number of lines used, and the caption (a label that describes the data being displayed) used is automatically adjusted. The font point size can be reduced in order to allow more information to be displayed on the single screen. The font itself can be changed to a font that requires less area (e.g., width) to display. The number of lines can be increased in order to allow the information to be displayed over multiple lines rather than a single line. The caption can be changed by partly or completely truncating the caption in order to provide the more useful information at a larger font size.

According to another aspect of the invention, the size of information being displayed is adjusted using the following process. If all of the information cannot be displayed at a desired font size, then an attempt is made to display the information at the desired font size but with a truncated caption. If that attempt is unsuccessful, then an attempt is made to increase the number of lines used to display the information. If there is insufficient space within the display area to increase the number of lines, then an attempt is made to reduce the font point size. This process continues until a size is determined at which the information can be displayed.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
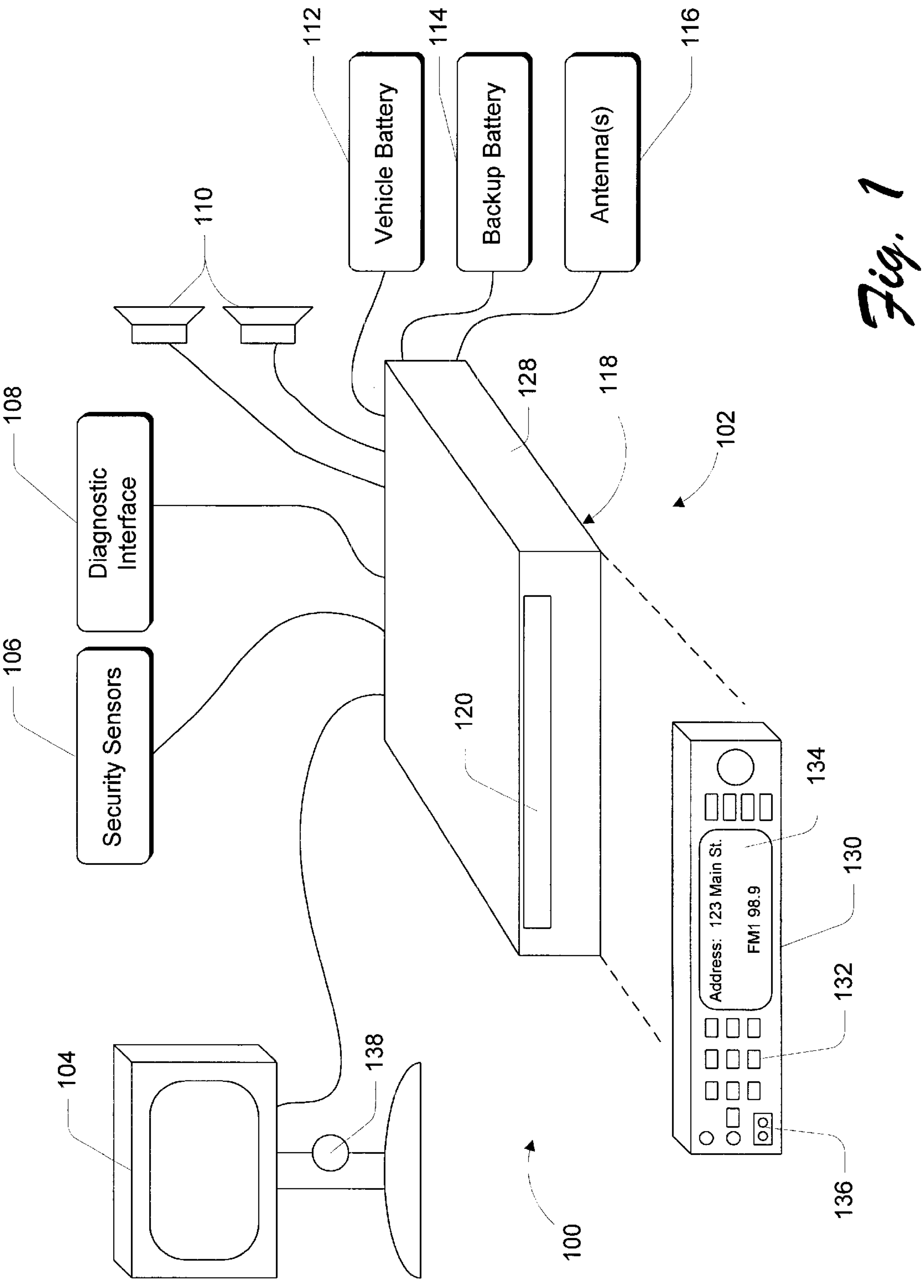
FIG. 1 shows an exemplary vehicle computer system such as may be used with the invention.

FIG. 1 shows an exemplary vehicle (e.g., automobile) computer system 100 such as may be used with the invention. Vehicle computer system 100 has a centralized computer 102 coupled to various external peripheral devices, including a display device 104, security sensors 106, a vehicle diagnostic interface 108, speakers 110, a vehicle battery 112, a backup battery 114, and antenna(s) 116. The computer 102 is assembled in a housing 118 that is sized to be mounted in a vehicle dashboard, similar to a conventional automobile stereo. In the illustrated example, the housing 118 has a form factor of a single DIN (Deutsche Industry Normen). Alternatively, it could be housed in a 2 DIN unit or other special form factor for an OEM.

The computer 102 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be specially configured for uniquely designed embedded systems. In the illustrated example the open hardware architecture runs multitasking operating system that employs a graphical user interface. A multitasking operating system allows simultaneous execution of multiple applications. One such operating system is the "Windows" brand of operating systems (e.g., the "Windows CE" operating system) sold by Microsoft Corporation of Redmond, Washington.

The computer 102 can include at least one storage drive which permits the vehicle user to download programs and data from a storage medium. In the illustrated implementation, the computer 102 has a CD ROM (or other optical) drive 120 which reads application-related CDs, as well as musical, video, game, or other types of entertainment CDs. The computer 102 may also include other storage devices, such as a magnetic disk drive, smart card reader, PCMCIA card sockets, a hard disk drive, or a DVD ("digital video disk" or "digital versatile disk") drive.

The storage drives are mounted in a base unit 128 of the housing 118. The base unit 128 is constructed and sized to be mounted in the dashboard. Optionally, this base unit may be removable in the same fashion as a laptop computer and its associated docking station. This option allows the user to take the vehicle computer to his/her home or office to serve as his/her portable PC. The housing 118 also has a faceplate 130 which is pivotally mounted to the front of the base unit 128 and may optionally be detachable. The faceplate can be rotated to permit easy and convenient access to the storage drives.

The computer 102 has a keypad 132 and a display 134 on the faceplate 130. The operating system executing on the computer 102 controls the faceplate peripheral, which through the faceplate processor, can control the faceplate keys 132 and the faceplate display 134 as peripheral devices when the faceplate is attached to the base unit. Additionally, the computer 102 has a voice recognition device to permit the user to verbally enter commands in a hands-free, eyes-free environment. These voice commands can be used for controlling most operating modes of the vehicle computing platform. The computer 102 is also equipped with an IrDA (infrared developers association) transceiver port 136 mounted on the faceplate 130 to transmit and receive data and programs using infrared signals. The entire faceplate unit 130 behaves as a multifunction peripheral to the computing platform.

The computer 102 can output visual data to the LCD 134 at the faceplate, or to the display device 104. In the exemplary illustration, display 134 is a back lit LCD and display 104 is a small flat panel display (e.g., 6.4" screen) that is movably mounted on a stand or yoke and remotely located from the computer. Additional display devices may also be added that are similar to display 104 or 134. Different types of display devices may also be added, such as a Heads Up Display (HUD).

The display 104 is fully adjustable to different viewing positions that can be seen by the driver or other passengers in the vehicle. The type of data displayed can range widely from word instructions concerning the vehicle's performance, to diagrammatic directions from a navigation system, to video movies for in-car entertainment. The display 104 can be equipped with an automatic override switch 138 which automatically disables the display of any non-driving related data when positioned to be viewed by the driver. When facing the driver, only information supportive and helpful to driving (e.g., diagnostics, navigation directions) is displayed on the monitor, while distracting information (e.g., video movies, games) is blocked from display. In one implementation, the switch is an electrical cylindrical switch which closes when the display is capable of being viewed by the driver; thus, the software can sense the display position and only allow permitted information to be displayed.

In general, the vehicle computer system 100 can be used to integrate multiple vehicle-related systems onto one open platform hardware and software architecture. For instance, the vehicle computer system 100 can serve as a multimedia entertainment system, a navigation system, a communications system, a security system, and a diagnostics system. Moreover, the vehicle computer system 100 provides additional functionality traditionally associated with desk-top and laptop personal computers. For instance, vehicle computer system 100 can support word processing applications, spreadsheet applications, database applications, and appointment/schedule applications. Furthermore, the vehicle computer system 100 can be configured to operate as a server to other computing units in the vehicle to distribute games, video movies, and the like to passengers.

In accordance with the invention, information can be displayed on either display device 104 or display 134. The information can be provided by an application running on computer 102, or by a device external to computer 102, such as sensors 106 or via diagnostic interface 108, antenna 116, IrDA port 136, etc. Information that can be displayed includes any type of data or control information. Additionally, information to be displayed can include a "caption" or "label" that describes the data. Examples of data that can be displayed include street addresses, phone numbers, and directions (e.g., "Turn Left At Light On Main Street"). Such data can be displayed either including a caption describing the data (e.g., "Address: 12345 Washington Street", where "Address:" is the caption portion of the information) or without a caption (e.g., "12345 Washington Street"). Examples of control information include toolbars, menu options, and user-selectable on-screen regions (such as buttons), as well as instructions, headings, and other descriptive information. It should be noted that, by automatically adjusting data and control information, size adjuster 202 relieves other applications from the burden of determining the appropriate size for such information.

The invention automatically adjusts the size of the information (e.g., text) displayed. The adjustment is based on the size of a display area available on the display 104 or 134 for displaying the information. The size of the information can be adjusted by making one or more changes, such as changing the point size of the font used to display the information, changing the font used to display the information, truncating a caption (rather than truncating the data that the caption describes), and/or changing the number of lines used to display the information.

In the discussion herein, the invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
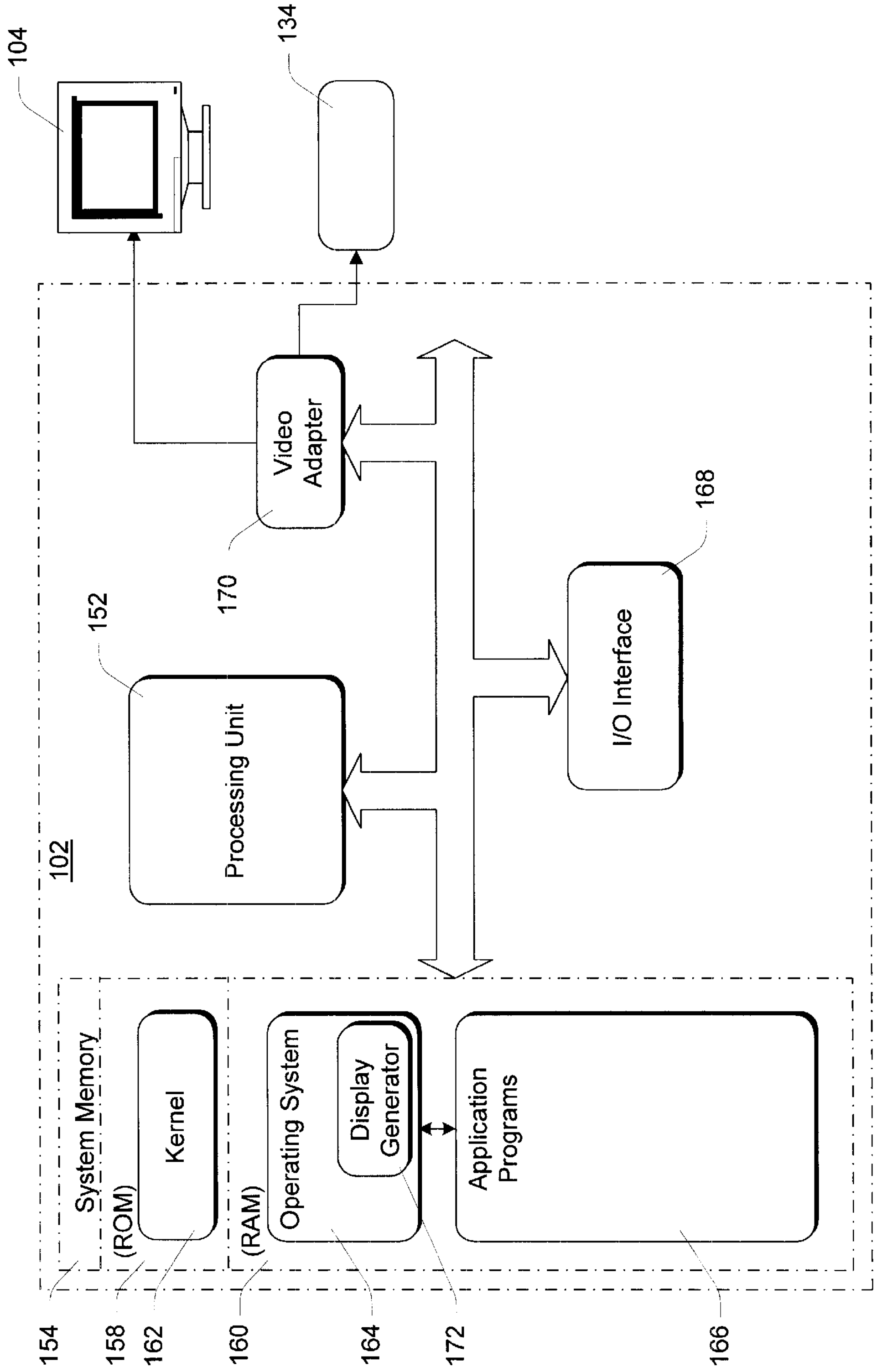
FIG. 2 shows exemplary components of the computer of FIG. 1 in more detail.

FIG. 2 shows exemplary components of computer 102 of FIG. 1 in more detail. Computer 102 includes one or more processors or processing units 152, a system memory 154, and a bus 156 that couples various system components including the system memory 154 to processors 152.

The bus 156 represents one or more of any of several types of bus structures, including a memory bus or memory controller, a peripheral bus, an accelerated graphics port, and a processor or local bus using any of a variety of bus architectures. The system memory 154 includes read only memory (ROM) 158 and random access memory (RAM) 160. A portion of the operating system, such as kernel 162, contains the basic routines that help to transfer information between elements within computer 102, such as during start-up, is stored in ROM 158.

A number of program modules may be stored in ROM 158 or RAM 160, including an operating system 164 and one or more application programs 166. A user may enter commands and information into computer 102 through various input devices, such as a keyboard (e.g., keypad 132 of FIG. 1), touchscreen, pointing device, microphone, joystick, game pad, satellite dish, scanner, or the like (not shown in FIG. 2). These and other input devices are coupled to the processing unit 152 through an input/output (I/O) interface 168 that is coupled to the bus 156. A display 104 or 134, or other type of display device, is also connected to the bus 156 via an interface, such as a video adapter(s) 170. Data to be displayed on display 104 or 134 is provided to adapter 170 by a display generator 172 of operating system 164. In addition to the display, computers can include other peripheral output devices (not shown in FIG. 2) such as speakers and printers that are coupled to the processing unit 152 through I/O interface 168.

Generally, the processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
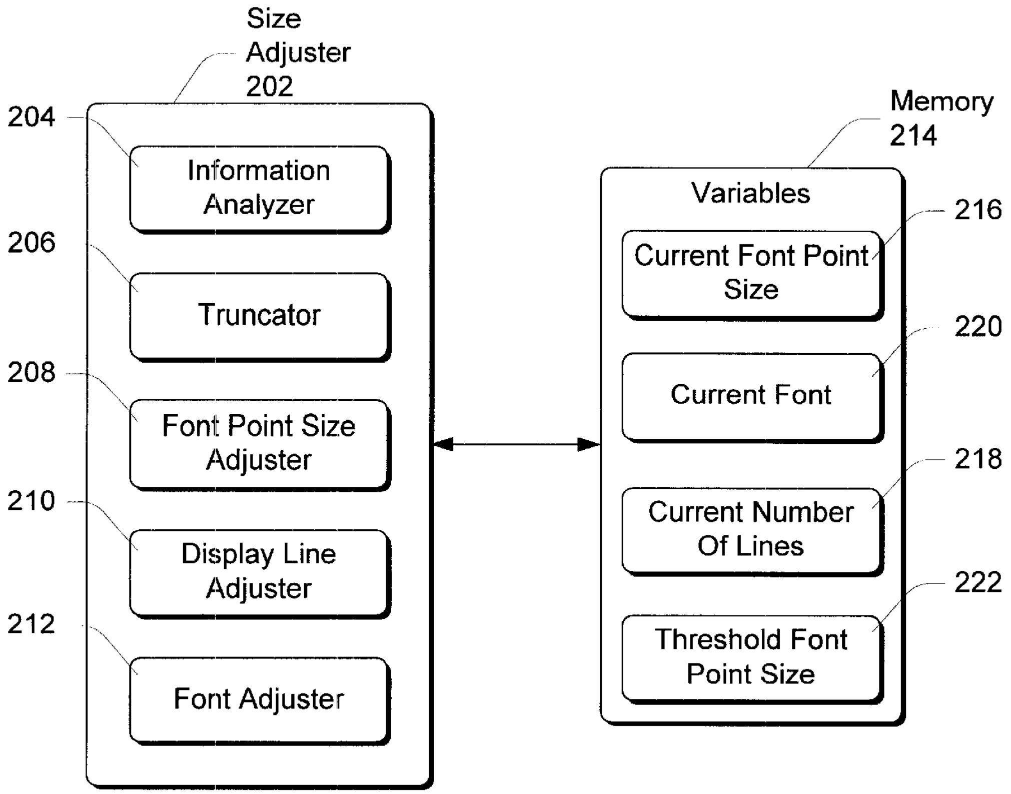
FIG. 3 is a block diagram illustrating exemplary components for automatically adjusting the size of displayed information in accordance with the invention.

FIG. 3 is a block diagram illustrating exemplary components for automatically adjusting the size of displayed information in accordance with the invention. A size adjuster 202 is illustrated, including an information analyzer 204, a truncator 206, a font point size adjuster 208, a display line adjuster 210, and a font adjuster 212. Various status information is maintained by the components 204–212 in memory 214. Memory 214 can be a system memory (such as memory 154 of FIG. 2), or alternatively other memory locations or registers within the computer 102. Size adjuster 202 can be implemented external to the operating system (e.g., one of application programs 166 of FIG. 2) as a module that can be invoked by the operating system, or alternatively as part of the operating system (e.g., part of operating system 164 of FIG. 2). Size adjuster 202 is invoked by display generator 172 of FIG. 2 prior to displaying the information.

Size adjuster 202 automatically adjusts the size of information, such as text, to be displayed to a user in order to make the information easily readable to the user. Adjuster 202 can adjust the size of the information in various manners, including adjusting (either reducing or increasing) the font point size, adjusting (either increasing or reducing) the number of lines used to display the information, and adjusting the font being used, as well as truncating the caption being displayed with the information. When adjuster 202 has adjusted the size of the information, the information and corresponding size identifiers (e.g., font point size, number of lines, font type, and caption to use) are provided to display generator 172 of FIG. 2 for use in displaying the information.

The adjustment made by adjuster 202 is based on a display area available for the information. In some situations, the display area available for the information is the entire surface of the display 134. That is, all of display 134 can be used as the display area. In other situations, the display area available for the information is less than the entire surface of the display 134. For example, the display area for control information may be limited to a smaller portion of the display (e.g., the dimensions of a user-selectable button). By way of another example, other information (e.g., user-selectable icons or instructions) may be displayed on the display 134 that limits the display area available for the information.

Size adjuster 202 receives the information to be displayed and optionally an indication of the size of the display area. For example, an application having a user-selectable button with text inside the button can provide the text and an indication of the size of the button (e.g., in pixels) to adjuster 202. The size of the button is then used by adjuster 202 as the display area and the text is automatically adjusted for display within the button. In situations where an indication of the size of the display area is not given, adjuster 202 uses a default value (e.g., the entire surface of display 134) as the display area. Alternatively, adjuster 202 may limit the display area based on other information (e.g., icons or other text) already being displayed. The portion of the display occupied by such other information can be provided to adjuster 202 from the operating system 164 of FIG. 2, or alternatively may be known by adjuster 202 if adjuster 202 is part of the operating system 164.

Information analyzer 204 compares the information to be displayed and the display area available (e.g., on display 134 of FIG. 1). Analyzer 204 determines whether the information can be displayed within the area available at a particular font, a particular font point size, and using a particular number of lines. Based on this analysis, various ones of adjusters 208–212 and truncator 206 are invoked to adjust the size of the information to be displayed. The adjustment process continues until the information can be displayed at an acceptable size.

Truncator 206 determines how to truncate a caption or label for information being displayed. The caption or label can vary depending on the nature of the information being displayed, and is provided to adjuster 202 by the application that is providing the information to be displayed. Truncator 206 truncates the caption by determining, based on the size of the display area and the information to be displayed, how many characters are to be removed from the caption and then removing that number of characters. It should be noted that the situation can arise where all characters are removed from the caption, resulting in a "complete" or "full" truncation. It should be noted that when truncating the caption, the corresponding data remains unchanged. For example, the caption "Address" may be truncated, but the corresponding street address is not truncated.

When a caption is truncated an indication may be given to the user that truncation has occurred. For example, ellipses can be added to the caption to indicate that the caption has been truncated. Alternatively, no such indication may be given. Whether such an indication is given to the user can vary depending on how much of the caption is truncated (e.g., no indication may be given if the caption is fully truncated.

Alternatively, different methods of truncation may be used. For example, characters may be removed from the end of the caption one by one and, after each character is removed, information analyzer 204 invoked to check whether the information can be displayed at the current font size and number of lines with the newly truncated caption. Another alternative methodology uses "intelligent" truncation, where an attempt is made to remove characters from the caption while leaving the caption as intelligible as possible. For example, it may be preferable to truncate "Address" to "Addrs" rather than "Addre". Different methodologies can be used to achieve an intelligent truncation. One such methodology uses a set of rules to truncate the caption. By way of example, the following rules could be used:

(1) Remove all punctuation from right to left.

(2) Remove all vowels (except possibly for the first letter in the caption) from right to left.

(3) Replace all duplicated consonants with a single consonant (e.g., replace "dd" with "d" and "ss" with "s") from right to left.

(4) Remove remaining characters one by one from right to left.

Truncator 206 would remove characters from the caption following these rules in order. Table I illustrates an example truncation of the caption "Address:" according to these rules.

TABLE I

| Action | Resulting Truncated Caption |
|---|---|
| Remove ":" -Rule 1 | Address |
| Remove "e" -Rule 2 | Addrss |
| Remove "s" -Rule 3 | Addrs |
| Remove "d" -Rule 3 | Adrs |
| Remove "s" -Rule 4 | Adr |
| Remove "r" -Rule 4 | Ad |
| Remove "d" -Rule 4 | A |

Another such methodology uses a set of pre-determined versions of a truncated caption along with an ordering. Truncator 206 checks the different versions, in accordance with the ordering, to determine a truncated caption to use. For example, various truncated versions of the caption "Address" are listed in Table II below. These versions are used by truncator 206 in their order of appearance in Table II.

TABLE II

| |
|---|
| Address |
| Addrs |
| Adrs |
| Ads |
| Ad |
| A |

Yet another such methodology takes advantage of different character widths, removing "wider" characters first. For example, in some fonts, the character "m" requires more width to display than both of the characters "i" and "l". Thus, the caption would require less width to display if the letter "m" were removed rather than both of the letters "i" and "l". Appropriate rules can be generated to remove "wider" characters first, thereby leaving more letters in the caption. It is to be appreciated that which characters, if any, are wider than which other characters is dependent on the font being used.

Font point size adjuster 208 adjusts the point size of the font as necessary. The font point size is adjusted in one-point increments, although alternatively different sized increments could be used. Font point size adjuster 208 maintains a current font size being contemplated for use in displaying the information in a memory location 216.

Font point size adjuster 208 can decrease or increase the font point size. The font point size can be reduced, for example, to allow more information to be displayed within a particular display area. Additionally, situations can arise where the font point size can be increased, thereby allowing the information to be displayed in a larger, more-readable size. For example, an application may indicate a particular font size to use, but there may be sufficient space within the display area to use a larger font point size. By way of another example, the font point size may have been previously reduced by adjuster 208 to fit within a particular number of lines, but then the number of lines available was increased. With the greater number of lines, it may be possible to display the information at a larger font point size than the size previously reduced to. In both of these examples, font point size adjuster 208 can increase the font point size.

Display line adjuster 210 adjusts the number of lines that are used to display the information. Adjuster 210 maintains a current number of lines being contemplated for use in displaying the information in a memory location 218. The number of lines to be used is dependent on the font and font point size being used.

Font adjuster 212 adjusts the font type that is used to display the information. Different fonts have different typefaces and thus display differently. For example, in some fonts each character is the same width, while in other fonts each character has a different width. Font adjuster 212 can alter the font being used to display the information in order to allow more information to be displayed in the given display area. Adjuster 212 maintains a current font being contemplated for used in displaying the information in a memory location 220.

Memory 214 also includes a memory location 222 in which a threshold font point size is stored. The threshold font point size represents a smallest point size at which information will be displayed. This threshold point size is, in one implementation, a smallest size at which information can still be read by the typical user of the display in a short period of time (e.g., during a quick glance while driving).

The threshold font point size, as well as a maximum font point size that can be used to display the information, can vary depending on the display area available and the font type. Example threshold and font point sizes for use with the invention for different display area widths for the "Tahoma" font type are listed in Table III below.

TABLE III

| | less than 320 pixels width | 320–479 pixels width | greater than 479 pixels width |
|---|---|---|---|
| Maximum Size | 13 point | 15 point | 18 point |
| Threshold Size | 9 point | 10 point | 11 point |

In the illustrated example, the components 204–212 represent software (or firmware) modules being executed by a processor such as processing unit 152 of FIG. 2. Alternatively, the components 204–212 could be implemented in hardware. For example, one or more application specific integrated circuits (ASICs) could be programmed with the functions of components 204–212.

Figure 4:
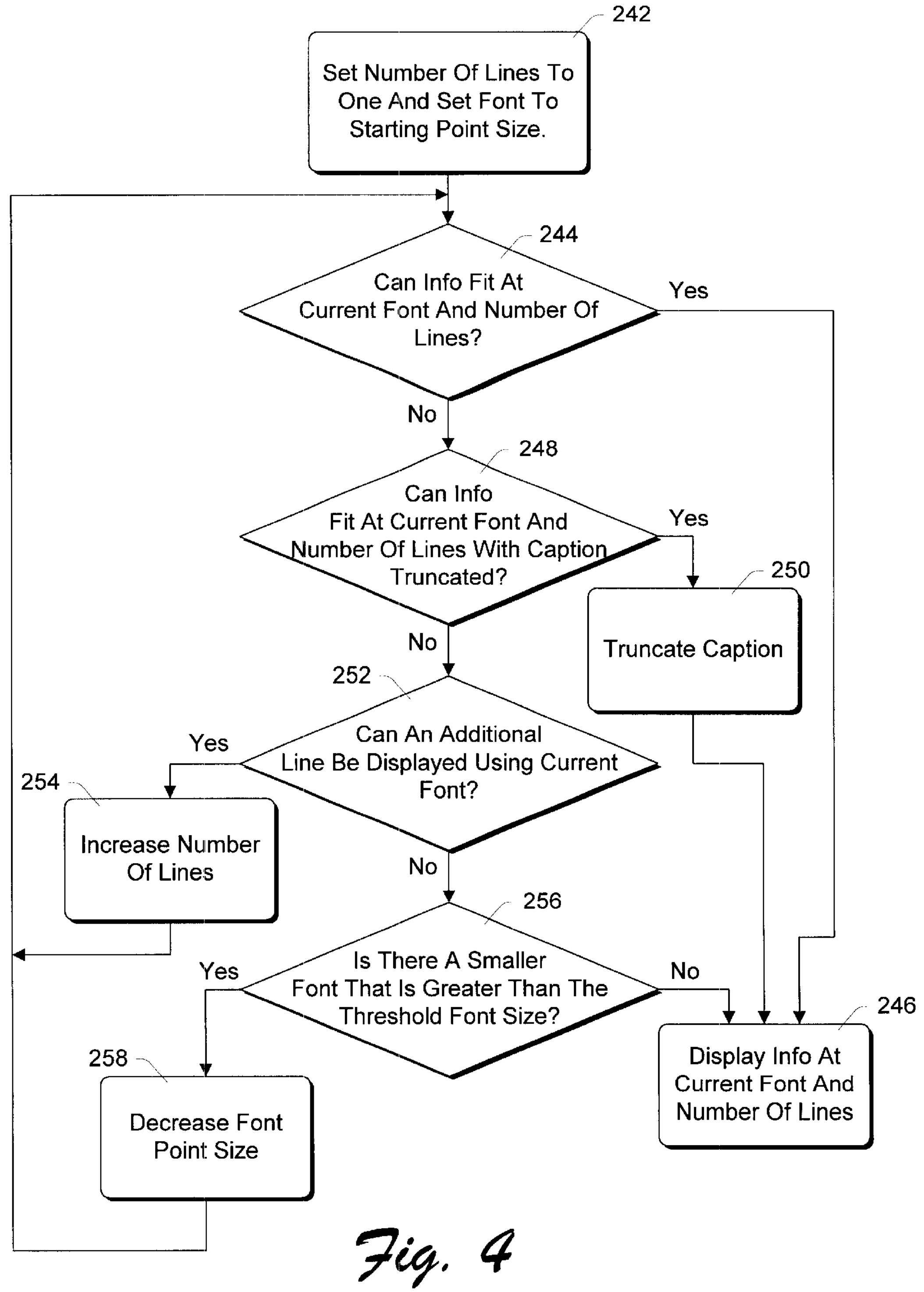
FIG. 4 is a flowchart illustrating an exemplary process for adjusting the size of displayed information in accordance with the invention.

FIG. 4 is a flowchart illustrating an exemplary process for adjusting the size of displayed information in accordance with the invention. The discussion of FIG. 4 references the display of information on display 134 of FIG. 1. However, it is to be appreciated that the display of information on other displays, such as display device 104 of FIG. 1, is within the spirit and scope of the invention.

A step 242 comprises setting the number of lines of information that can be displayed on display 134 to one and setting the font to a starting point size. The starting point size is a largest point size at which the invention will attempt to display information. This largest point size is, in one implementation, a size that results in the information being easily readable by the typical user of the display 134.

A step 244 comprises checking whether all of the desired information can be displayed within the display area at the current font point size and number of display lines (as set in step 242). The area of the display 134 that is available for displaying the information is known, as is the amount of display area that the information would require. For example, it is readily known that the information: "Address: 1 Bellevue Rd." would require a particular height and width on the display 134 at a given point size.

If the desired information can be displayed at the current font point size and number of display lines, then a step 246 comprises displaying the information, along with a complete caption, at the current font point size and number of display lines.

However, if the desired information cannot be displayed at the current font point size and number of display lines, then a step 248 comprises determining whether the information can be displayed at the current font point size and number of lines with a truncated caption. This determination can be made by checking whether the information without a caption can be displayed at the current font point size and number of lines. If so, then the desired information can be displayed at the current font point size and number of display lines with a truncated caption.

A step 250 comprises truncating the caption, after which the information is displayed, with truncated caption, at the current font point size and number of lines (step 246). Truncation of the caption can be carried out in any of the manners discussed above.

Returning to step 248, if the information cannot be displayed at the current font point size and the current number of lines with the caption truncated, then a step 252 comprises checking whether an additional line can be displayed using the current font point size. Whether an additional line can be displayed using the current point size is dependent on both the height of characters in the current font point size and the display area available on display 134. Each of these values is known, so the determination can be readily made.

If an additional line can be displayed using the current point size, then a step 254 comprises increasing the number of lines. In the illustrated example, the number of lines is increased by one. Alternatively, the number of lines may be increased by a larger amount, or may be increased to the maximum number of lines that can be displayed in the display area available on display 134 using the current font.

Processing then returns to step 244, where a check is again made, using the newly updated number of lines, as to whether the information can be displayed using the current font and number of lines.

Returning to step 252, if an additional line cannot be displayed using the current font, then a step 256 comprises checking whether there is a font point size, smaller than the current font point size, that is greater than a threshold font point size.

If there is no smaller point size, then the information is displayed at the current point size and number of lines (step 246), without any caption. It should be noted that some of the information may not be displayed, or may be displayed on a second screen that can be scrolled to. However, the threshold point size is set so that not displaying some information or requiring scrolling is preferable to reducing the point size any more.

However, if there is a smaller point size, then a step 258 comprises decreasing the point size. In the illustrated example, the point size is decreased by one. Alternatively, the point size may be decreased by a larger amount, or may be decreased to the threshold point size.

Processing then returns to step 244, where a check is again made, using the newly updated number of lines, as to whether the information can be displayed using the current font and point size number of lines.

The process illustrated in FIG. 4 continues until a current font point size, number of lines, and appropriately truncated caption are determined and displayed in step 246.

FIG. 4 provides an example process for adjusting the size of the information to be displayed. However, various alternative processes may also be used and are within the spirit and scope of the invention. For example, rather than increasing the number of lines when possible (step 252), step 252 could be skipped until the threshold font size is reached in step 256, at which point a check would be made to determine whether the number of lines can be increased.

FIG. 4 illustrates how truncator 206, display line adjuster 210, and font point size adjuster 208 are used in a sequence to adjust the size of the information to be displayed. FIG. 4 shows one sequence, but any sequence of these components can be used. For example, display line adjuster 210 may be used first, followed by font point size adjuster 208 and then truncator 206 last, resulting in attempting to increase the number of display lines and reduce the font size first, and then trying truncation of the caption if necessary.

FIGS. 5*a*–5*g* are example displays in accordance with the invention.

Figure 5A:
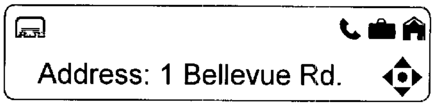
FIGS. 5*a*, 5*b*, 5*c*, 5*d*, 5*e*, 5*f*, and 5*g* are example displays in accordance with the invention.

In FIG. 5*a*, the information being displayed, "1 Bellevue Rd." and the caption "Address:" have a combined width small enough to fit at the full font point size (the starting point size in step 242 of FIG. 4) without truncating the caption. In FIG. 5*b*, the data being displayed, "1 Bellevue Rd. #301" in combination with the full caption of "Address:" requires too much area (width), so the information is displayed at the full font point size with a caption truncated to "Addre:". Ellipses are added to the caption to indicate that the caption has been truncated. FIG. 5*c* is similar to FIG. 5*b*, except that the caption is truncated to "Addrs:" rather than "Addre:". Again, ellipses are added to the caption to indicate that the caption has been truncated.

Figure 5D:
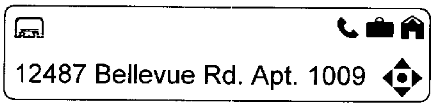
Figure 5B:

In FIG. 5*d*, the information to be displayed, "Address: 12487 Bellevue Rd. Apt. 1009" requires too much area (width) to fit at the full font point size. Thus, the caption is dropped and the point size is reduced by one point.

Figure 5E:
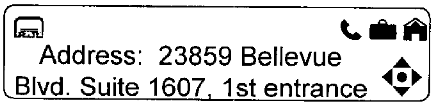
Figure 5C:

Similarly, in FIG. 5*e*, the information to be displayed "Address: 23859 Bellevue Blvd. Suite 1607, 1st entrance" requires too much area (width) to fit on either one or two lines at the full font point size. The information is displayed over two lines and the point size is reduced by one point.

Figure 5F:
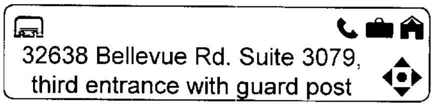

In FIG. 5*f*, the information to be displayed, "Address: 32638 Bellevue Rd. Suite 3079, third entrance with guard post" requires too much area (width) to fit at either the full font point size or one point reduced on either one or two lines. The font point size is thus reduced two points, the caption is dropped, and the information is displayed on two lines.

Figure 5G:
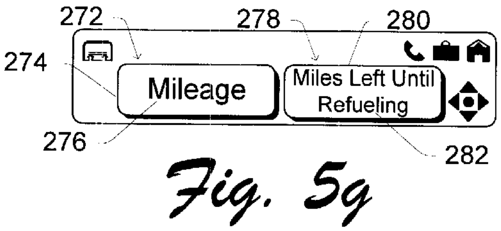

In FIG. 5*g*, the information being displayed is two buttons. Button 272 includes a border 274 and text 276, while button 278 includes a border 280 and text 282. No captions are included in the information to be displayed. The display area available for text 276 is the area within border 274, while the display area available for text 282 is the area within border 280. The text 276 requires less display area than the text 282, so the text 276 can be displayed at a larger font point size.

Conclusion

The invention automatically adjusts the size of displayed information based on an available display area. The invention advantageously changes the size of information to be displayed in order to increase the amount of information that is displayed within a display area using a readable font and font size. The invention can adjust any one or more of the font point size, the font, the number of lines used, and the caption used in order to determine the manner in which the information is displayed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:

receiving data that includes a caption and corresponding text;

determining if truncating the caption would allow the data with a truncated caption to be displayed on a number of lines using a first font point size; and displaying the data with the truncated caption at the first font point size if truncating the caption would allow the data with the truncated caption to be displayed on the number of lines using the first font point size.

2. A method as recited in claim 1, wherein the number of lines comprises one line.

3. A method as recited in claim 1, wherein the displaying comprises displaying the data within a display area of a display device, the display area comprising an entire display surface of the display device.

4. A method as recited in claim 1, further comprising:

if truncating the caption would not allow the data with the truncated caption to be displayed on a single line using the first font point size, then increasing the number of lines that are used to display the data.

5. A method as recited in claim 1, further comprising:

if truncating the caption would not allow the data with the truncated caption to be displayed on a single line using the first font point size, then reducing the font point size to a second font point size that is less than the first font point size.

6. A method as recited in claim 1, further comprising truncating the caption to generate the truncated caption, the truncating comprising removing characters from the caption until the caption is small enough so that the data can be displayed on a single line using the first font point size.

7. A method as recited in claim 6, wherein the removing of characters from the caption comprises removing characters one at a time.

8. A method as recited in claim 6, wherein the removing of characters from the caption comprises removing characters according to a predetermined list of alternate captions.

9. A method as recited in claim 6, wherein the removing of characters from the caption comprises applying a set of rules to determine which characters are removed, wherein the set of rules includes removing one or more vowels before removing any consonants.

10. One or more computer-readable memories containing a computer program that is executable by a processor to perform the method recited in claim 1.

11. A vehicle computer programmed to perform the method as recited in claim 1.

12. A method for displaying user-selectable control information within a display area of a display device, the method comprising:

receiving data to be displayed;

determining, based on the amount of data and a number of lines available for data display, a font point size to use to display the data; and determining, based on the amount of data and a number of lines available for data display, a font type to use to display the data.

13. An apparatus comprising:

a display device having a display area in which information can be displayed to a user; and a size adjuster, coupled to the display device, to adjust the size of the data to be displayed to the user based on both the amount of data and a size of the display area, the size adjuster including, a truncator to truncate a caption portion of the data based at least in part on the amount of data in a non-caption portion of the data, and a font point size adjuster to change the point size of the font used to display the data.

14. An apparatus as recited in claim 13, wherein the font point size adjuster is to change the point size of the font by reducing the point size of the font.

15. An apparatus as recited in claim 13, wherein the display area comprises less than an entire display surface of the display device.

16. An apparatus comprising:

a size adjuster, coupled to the display device, to adjust the size of the data to be displayed to the user based on both the amount of data and a size of the display area, the size adjuster including, a truncator to truncate a caption portion of the data, a font point size adjuster to change the point size of the font used to display the data, and a font adjuster to change the font type used to display the data.

17. An apparatus as recited in claim 13, wherein the size adjuster further comprises a display line adjuster to change the number of lines used to display the data.

18. A computer comprising:

a bus;

a processor coupled to the bus;

a display device having a display area in which information can be displayed to a user; and a memory, coupled to the bus, including a program that, when executed by the processor, causes the processor to step through a plurality of font point size reductions until a font point size is obtained at which all of the data can be displayed within the display area, wherein the data comprises user-selectable control information.

19. A method comprising:

receiving data, from an application program, including a caption and corresponding text;

adjusting, based on the amount of data and a size of a display area, the font point size to use to display the data;

truncating the caption, based at least in part on both the amount of data in the corresponding text and a size of a display area;

generating display information including the text at the font point size and the truncated caption; and sending the display information to a video adapter for display on a display device.

20. One or more computer-readable memories containing a computer program that is executable by a processor to perform the method recited in claim 19.

21. A method comprising:

receiving text to be displayed within a display area; and determining, based on the amount of text and a number of lines available for text display, a font type to use to display the text.

22. One or more computer-readable memories containing a computer program that is executable by a processor to perform the method recited in claim 21.

23. A method comprising:

receiving data that includes a caption and corresponding text;

determining, based at least in part on the amount of data, a font type to use to display the data;

determining if truncating the caption would allow the data with a truncated caption to be displayed on a number of lines using a first font point size; and displaying the data with the truncated caption at the first font point size if truncating the caption would allow the data with the truncated caption to be displayed on the number of lines using the first font point size.

24. One or more computer-readable memories containing a computer program that is executable by a processor to perform the method recited in claim 23.

25. A method comprising:

receiving data, from an application program, including a caption and corresponding text;

adjusting, based on the amount of data and a size of a display area, the font point size to use to display the data;

adjusting, based on the amount of data and the size of the display area, a font type to use to display the data;

truncating the caption, based on the amount of data and a size of a display area;

generating display information including the text at the font point size and the truncated caption; and sending the display information to a video adapter for display on a display device.

26. A method as recited in claim 1, wherein truncating the caption comprises removing the caption.

27. An apparatus as recited in claim 13, wherein the truncator is to truncate the caption portion by removing the caption portion.

28. A method as recited in claim 19, wherein truncating the caption comprises removing the caption.

29. A method as recited in claim 1, further comprising displaying, with the data, an indication that the caption has been truncated.

30. A method as recited in claim 19, further comprising including, in the display information, an indication that the caption has been truncated.

* * * * *

UNITED STATES PATENT AND TRADEMARK OFFICE

CERTIFICATE OF CORRECTION

PATENT NO. : 6,452,597 B1
DATED : September 17, 2002
INVENTOR(S) : Goldberg et al.

It is certified that error appears in the above-identified patent and that said Letters Patent is hereby corrected as shown below:

Title page,
Item [56], U.S. PATENT DOCUMENTS, replace the cited reference "6,272,332" with -- 6,272,322 --.

Signed and Sealed this

Eleventh Day of February, 2003

JAMES E. ROGAN
*Director of the United States Patent and Trademark Office*